United States Patent [19]

Tozu et al.

[11] Patent Number: 4,895,416
[45] Date of Patent: Jan. 23, 1990

[54] HYDRAULIC BRAKE SYSTEM FOR VEHICLES

[75] Inventors: Kenji Tozu, Kariya; Masamoto Ando, Toyota; Tsuyoshi Yoshida, Obu; Kazutaka Kuwana; Michiharu Nishii, both of Toyota; Genji Mizuno, Toyoake, all of Japan

[73] Assignee: Aisin Seiki Kabushiki Kaisha, Aichi, Japan

[21] Appl. No.: 260,795

[22] Filed: Oct. 21, 1988

[30] Foreign Application Priority Data

Oct. 21, 1987 [JP] Japan ................... 62-265769

[51] Int. Cl.⁴ ............................................. B60T 8/88
[52] U.S. Cl. ........................................ 303/92; 303/116
[58] Field of Search ............... 303/92, 111, 113, 114, 303/116, 119; 364/426.02

[56] References Cited

U.S. PATENT DOCUMENTS

| | | | |
|---|---|---|---|
| 4,728,156 | 3/1988 | Burgdorf et al. | 303/92 |
| 4,779,936 | 10/1988 | Farr | 303/92 X |
| 4,802,710 | 2/1989 | Burgdorf et al. | 303/92 X |

Primary Examiner—Duane A. Reger
Attorney, Agent, or Firm—Sughrue, Mion, Zinn, Macpeak & Seas

[57] ABSTRACT

The hydraulic brake system for a motor vehicle provides a brake fluid level detector which provides a signal to a control apparatus whereby the motor driven pump for providing braking pressure will be deactivated when the brake fluid level falls below a predetermined value. The system is also provided with pressure detector which detects the output fluid pressure and provides a signal to a control apparatus for stopping the anti-locking control apparatus of the brake system if the pressure falls below a predetermined value.

2 Claims, 4 Drawing Sheets (a)

(b)

HYDRAULIC BRAKE SYSTEM FOR VEHICLES

BACKGROUND OF THE INVENTION

This invention relates to a hydraulic brake system for vehicles, and more particularly to a hydraulic brake system for vehicles which are provided with an anti-lock control apparatus.

In a normal brake system for vehicles, a brake fluid pressure control apparatus is used for supplying a brake fluid pressure in response to an actuation of a brake pedal whereby a specific brake fluid pressure is supplied to a wheel cylinder to operate a brake associated with each wheel.

Recently, a hydraulic booster which can boost and drive a master cylinder in response to operation of a brake pedal as a boost source of an output power fluid pressure of a power fluid pressure source has been utilized as a server boost apparatus, and it was proposed to use the output fluid pressure of the hydraulic booster for an anti-lock control apparatus for preventing locking of a wheel upon braking. Such an apparatus has been disclosed in Japanese Patent Publication No. 56(1981)-10219 wherein an auxiliary pressure source, namely, the power fluid pressure source is used, so that a means is provided for blocking a wheel cylinder and a pressure chamber during the antiskid actuation so as to not consume the fluid pressure within the pressure charge of the master cylinder, if a motor or a pump is damaged. Further, any trouble caused by the damage of the pump etc. can be sensed by determining whether the pressure within an accumulator is below a predetermined value or not by use of a pressure sensing switch.

Further, in Japanese Patent Laid Open Publication No. 59(1984)-145655, an apparatus is disclosed in which a fluid pressure and a fluid level are sensed and the antiskid control is stopped. That is to say, the pressure decrease and the decrease of the fluid level are presented as an output of a NOR gate, and a solenoid valve is not actuated after a time determined by a delay element has passed.

In the former prior art, it is feared that the fluid of the reservoir, namely, the remaining quantity of brake fluid will be insufficient upon the detection of the pressure decrease and that the pressure will not be sufficient as a control input.

Also, in the latter prior art, it is desirably disclosed that the fluid level is a control input as is the pressure and the remaining quantity of the fluid to be maintained upon the stop of the anti-lock control, and these are selectively chosen as inputs. Accordingly, when the anti-lock control during the actuation thereof is stopped by the decrease of fluid, a driver is obliged to return to normal brake actuation without any advance warning. In order to prevent this problem, it is required to separately provide a fluid level detector which has a different detecting level for the warning and matching with the stop of the anti-lock control becomes necessary.

SUMMARY OF THE INVENTION

It is, therefore, an object of the present invention to provide a hydraulic brake system for vehicles in which the necessary amount of brake fluid for a normal brake actuation is maintained upon the occurrence of trouble in a power fluid pressure source etc. and an anti-lock control is stopped and the braking operation is smoothly transferred to a normal brake actuation.

In accomplishing this object, the hydraulic brake system for vehicles includes a reservoir for storing a brake fluid, a power fluid pressure source supplying a power fluid pressure by increasing the pressure to a predetermined pressure by means of a motor driven pump, a brake fluid pressure control apparatus fluidically communicated with the power fluid pressure source and the reservoir in response to the operation of the brake pedal of a vehicle, a wheel cylinder fluidically communicated with the brake fluid pressure control apparatus via a plurality of fluid passages for operating a braking member, a first fluid passage fluidically communicating the wheel cylinder with the reservoir, a second fluid passage accepting the power fluid pressure as an input, an anti-lock control apparatus for open-close control of said first and second fluid passages by a valve apparatus in response to a lock condition of the brakes, a fluid level detector for detecting the fluid level of the brake fluid of the reservoir, a fluid level discriminating means for determining whether the amount of brake fluid is above a predetermined value or not by an output signal from the fluid level detector means, a motor control means for stopping the motor when it is determined that the amount of brake fluid is below a predetermined value, a pressure detector for detecting an output power fluid pressure of the power fluid pressure source, a fluid pressure discriminating means accepting an output signal of the pressure detector as an input and discriminating whether the output power fluid pressure of the power fluid pressure source is above a predetermined value or not, and an anti-lock control stop means for stopping the open-close control of the valve apparatus in the anti-lock control apparatus, when it is discriminated that the amount of brake fluid is below a predetermined value and the output power fluid pressure is below a predetermined value.

BRIEF DESCRIPTION OF THE DRAWINGS

The above objects and following description will become readily apparent with reference to the accompanying drawings, wherein.

DESCRIPTION OF THE PREFERRED EMBODIMENT

Figure 1:
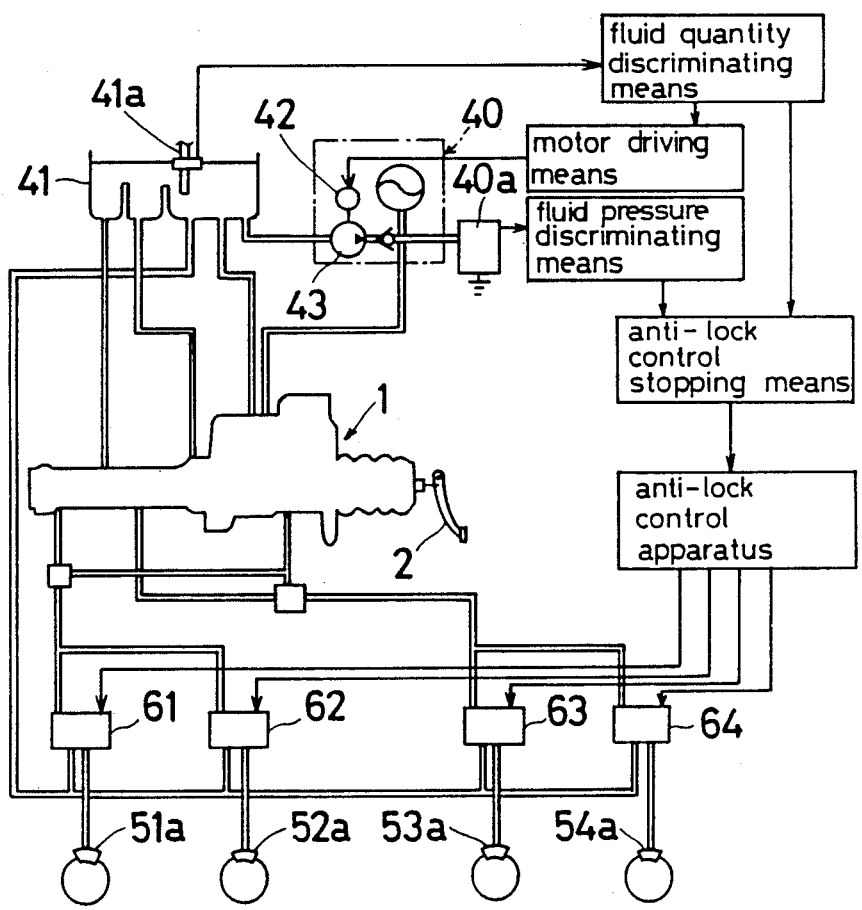
FIG. 1 is a functional block diagram showing the construction of the present invention.

FIG. 1 schematically illustrates the organization of the brake fluid pressure control apparatus 1, the reservoir 41, the pump 43 driven by a motor 42, the motor driving means, the fluid quantity and pressure discriminating means, the anti-lock control stopping means, the auto-lock control apparatus and the control valves 61-64 for the wheel cylinders 51a-59a.

Figure 2:
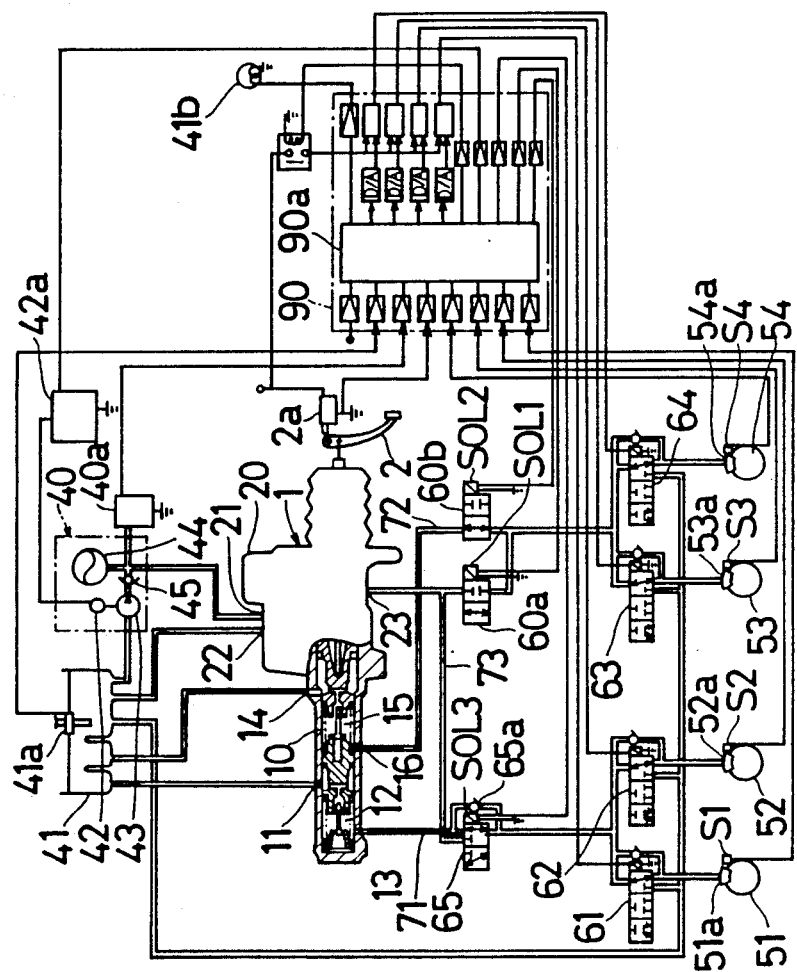
FIG. 2 is a schematic diagram of a preferred embodiment of a hydraulic brake system for vehicles according to the present invention.

Referring now to FIG. 2, which shows a preferred embodiment of the present invention, a brake fluid pressure control apparatus 1 is adopted with a tandem master cylinder 10 and a hydraulic booster 20. A port 11 of the tandem master cylinder 10 is fluidically communicated with a reservoir 41 for storing a brake fluid and supplies the brake fluid to a pressure chamber 12. A port 13 of the tandem master cylinder 10 is fluidically communicated with the pressure chamber 12 and further with wheel cylinders 51a, 52a of a brake apparatus of front wheels 51, 52 via a changeover valve 65 and control valves 61, 62. Similarly, a port 14 of the tandem master cylinder 10 is fluidically communicated with the reservoir 41, and a port 16 thereof is fluidically communicated with a pressure chamber 15 and further with wheel cylinders 53a, 54a of a brake apparatus of rear wheels 53, 54 of vehicles via a changeover valve 60b, control valves 63, 64. Accordingly, the brake fluid pressure is supplied to wheel cylinders 51a to 54a by the actuation of the tandem master cylinder 10.

The hydraulic booster 20 boosts and drives the tandem master cylinder 10 in response to a brake pedal 2 as a boost source of a power fluid pressure which is supplied by a power fluid pressure source 40 fluidically communicated with a port 21. A port 22 is fluidically communicated with the reservoir 41 and an excess brake fluid upon the stop and after the control to a predetermined fluid pressure is returned to the reservoir 41. Further, a port 23 of the hydraulic booster 20 is fluidically communicated with a changeover valve 65 and also with a fluid pressure passage 72 of a rear wheel side via a changeover valve 60a, and the above mentioned fluid pressure is generated as an output.

In this embodiment, the hydraulic booster 20 is utilized, however, a vacuum booster etc. can also be utilized as a boost apparatus. In case that the vacuum booster is used as a boost apparatus, the power fluid pressure is supplied to changeover valves 60a, 65 via a regulator separately provided. The power fluid pressure source 40 is adopted with a pump 43 driven by a motor 42 which intermittently controls in response to the output fluid pressure. An input side is fluidically communicated with the reservoir 41 and an output side is fluidically communicated with an accumulator 44 via a check valve 45. The brake fluid increased the pressure within the pump 43 is supplied to a necessary portion as a power fluid pressure via the accumulator 44.

Changeover valves 60a, 60b are a two-port two position electromagnetic valves which and are connected to a control circuit 90 and are driven by solenoid coils SOL 1, SOL 2 energized by an output signal of the control circuit 90 and are normally fluidically communicated with a fluid passage 72 in the nonenergized state.

The changeover valve 65 is a three-port two position electromagnetic valve which is interposed between fluid passages 71, 73 and normally communicates control valves 61, 62 with the port 13. When a solenoid coil SOL 3 is energized, a fluid passage 71 is blocked by the changeover valve 65 and the changeover valve 65 is fluidically communicated with the port 23. A check valve 65a is provided in parallel with the changeover valve 65. This means that the returning speed of the brake fluid from control valves 61, 62 to the tandem master cylinder 10 is expedited.

Control valves 61 to 64 are a three-ports three position electromagnetic valve, and fluidically communicate fluid passages with wheel cylinders 51a to 54a at the first position and blocks at the second position and also blocks at the third position and simultaneously communicates wheel cylinders 51a to 54a with the reservoir 41, and is driven by a solenoid coil energized by the output signal of the control circuit 90. A check valve is provided in parallel with control valves 61 to 64 and is operated same as the check valve 65a.

Speed sensors 51 to 54 are provided on front and rear wheels 51 to 54 and are connected to the control circuit 90 for supplying a wheel speed signal as an output. A brake switch 2a is provided on the brake pedal 2 for detecting the actuation of the brake pedal 2 and supplying an output to the control circuit 90.

A pressure detector 40a is provided in a fluid passage of an output side of the power fluid pressure source 40, and an analogue signal corresponding to the power fluid pressure or a digital signal corresponding to a predetermined pressure value is supplied to the control circuit 90.

The reservoir 41 is provided with a fluid level detector 41a, for example, a lead switch (not shown) is built in a shaft fixed to a case and detects a fluid surface level by the actuation of a float moved in accordance with the displacement of the fluid surface within the reservoir 41, namely the brake fluid level is detected and the control circuit 90 accepts an output.

The control circuit 90 accepts the above mentioned detected signal and a vehicle's speed signal etc. from a vehicle speed sensor (not shown) as an output and this is amplified by an amplifier in the control circuit 90 and is processed by a microcomputer 90a by A/D conversion if necessary, and an output is transmitted to each solenoid coil etc. of control valves 61 to 64.

That is to say, a slip ratio S(t) is formulated by the wheel speed and the vehicle speed and the slip state of the wheel is discriminated, so that the energization and nonenergization of solenoid coils of control valves 61 to 64 are controlled and wheels 51 to 54 are controlled so as not to be locked.

A warning lamp 41b is switched on when the fluid level is under the predetermined value in accordance with an input signal of the fluid level detector 41a, and the driver notices this as a warning. This constitutes a self diagnosis apparatus for the vehicles. A reference numeral 42a is a relay which performs the ON-OFF control of the motor 42 and constitutes a motor driving means.

The anti-lock control apparatus according to the present invention is constituted by each detector, control circuit 90, and control valves 61 to 64 and each means in this invention is included in the control circuit 90.

The operation according to the present invention is described hereinafter:

Changeover valves 65, 60a, 60b, control valves 61 to 64 are located at the state shown in FIG. 2 upon normal braking and the brake fluid pressure is generated from the tandem master cylinder 10 boosted by the hydraulic booster 20 in response to the brake pedal 2 as an output and the brake actuation of front and rear wheels 51 to 54 is performed. When the slip state of the wheel is sensed by the control circuit 90 and it is transferred to the anti-lock control, changeover valves 60a, 60b 65 are actuated by the control circuit 90 and the output fluid of the hydraulic booster 20 is supplied from the port 23 to all control valves 61 to 64. Then, three positions of each control valve 61 to 64 are suitably selected in response to the locked state of rotation of front and rear wheels 51–54 and the fluid pressure within wheel cylinders 51a–54a is regulated. The fluid pressure and fluid level are always checked by pressure detector 40a and fluid level detector 41a.

Figure 3:
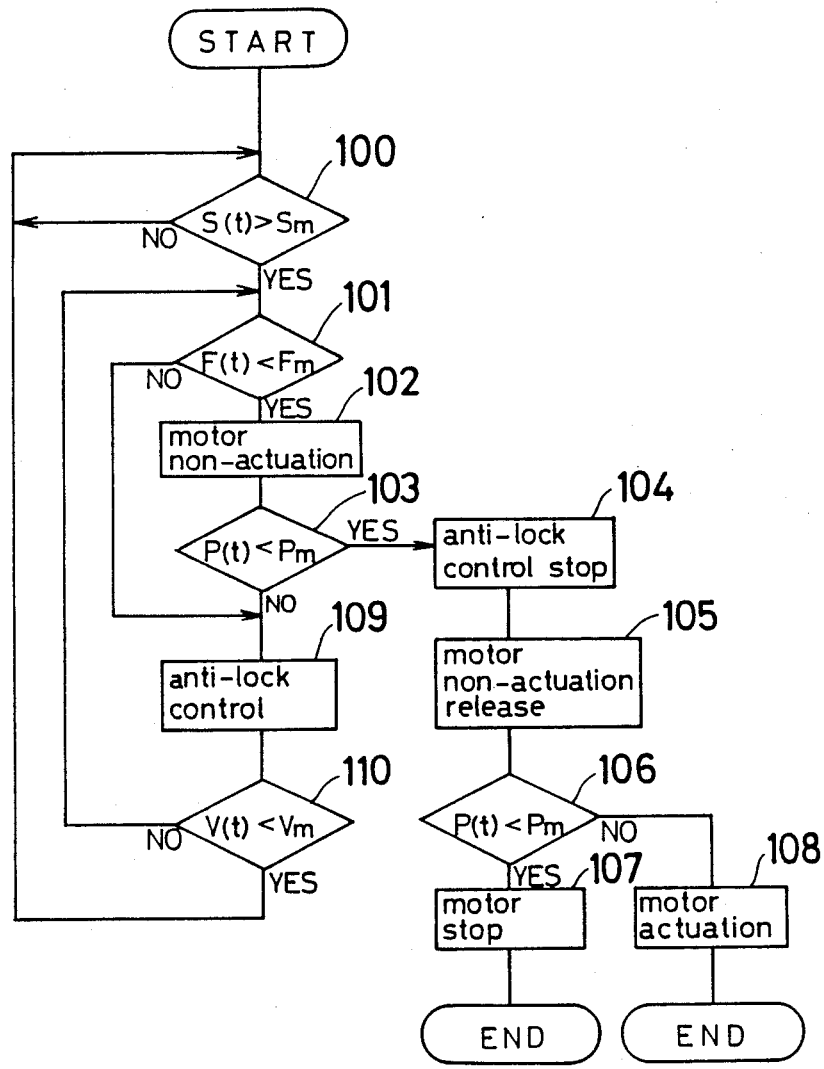
FIG. 3 is a flow chart showing a control routine of the present invention in FIG. 1.
Figure 4:
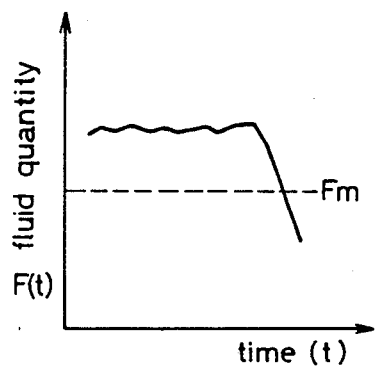
FIG. 4a is a diagram of a characteristic showing a time change of the amount of fluid in a reservoir.
FIG. 4b is a view similar to FIG. 4a, showing a time change in the fluid pressure of a power fluid pressure source.
Figure 4:
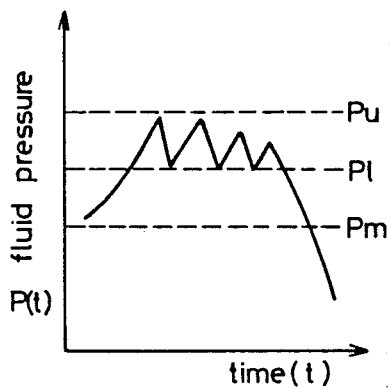

The monitoring of the power fluid pressure during anti-lock control and the action upon detection of an abnormal state are combined in a main routine of the anti-lock control in the control circuit 90 as shown in FIG. 3 and processed at predetermined time intervals (for example, every 4 ms) as a link in the chain of the anti-lock control in the control circuit 90. That is to say, when the control routine in FIG. 3 is started, the slip ratio S(t) is compared with a predetermined slip ratio Sm at step 100. In the case where the slip ratio S(t) exceeds the predetermine slip ratio Sm, it is judged that the anti-lock control is necessary and it moves to step 101 and so on. At step 101, the output signal of the fluid level detector 41a is received and the fluid quantity F(t) of the brake fluid within the reservoir 41 is compared with a predetermined value Fm. The fluid amount F(t) is slightly changed in accordance with the brake control, anti-lock control with the progress of time as shown in FIG. 4a, however, it does not fall below the predetermined value Fm at the normal state. When the leakage of the brake fluid is generated by a problem with the power fluid pressure source 40, it may fall below the predetermined value Fm. At this time, it goes to step 102 and the motor 42 is deactivated for a certain time by the relay 42a. Accordingly, only the remaining fluid pressure remains in the fluid passage. When the fluid amount F(t) is above the predetermined value Fm, it goes to step 109 and the anti-lock control is performed. It is desirable to operate in accordance with the integral value of a predetermined time in the comparison with the predetermined value Fm taking into consideration the change in the fluid level F(t).

Next, it advances from step 102 to step 103 and a detecting fluid pressure P(t) of the fluid pressure detector 40a is compared with a predetermined value Pm. In this case, the motor 42 is controlled so as to keep the output power fluid pressure of the pump 43 within a predetermined range (between maximum value Pu and minimum value Pl), the fluid pressure P(t) is changed within the abovementioned range in accordance with the passage of time as shown in FIG. 4b. In the case where the motor 42 is non-actuated and the fluid pressure P(t) stays within the abovementioned range for the predetermined time, it goes to step 109 and the anti-lock control is performed. However, when it is judged that the fluid pressure P(t) falls below the predetermined value Pm at step 103, the anti-lock control is stopped at step 104. That is to say, changeover valves 60a, 60b, 65 are deactivated by the control circuit 90 and return to the state in FIG. 2 and return to the normal brake actuation. The comparison of the fluid pressure with the predetermined value Pm by a momentary value is avoided, so it is desirable to compare by the integral value of the predetermined value.

Thus, when the fluid level F(t) is below the predetermined value Fm at step 101, the warning lamp 41b is switched on by another warning control and the driver notices the warning for the insufficient fluid level thereafter, the motor 42 is deactivated for the predetermined time and a predetermined time is required for the comparison of the fluid pressure P(t) at step 103, so that it is smoothly transferred to the normal brake actuation. The motor 42 is again driven for assuring the power fluid pressure supplied to the hydraulic booster 20 at steps 105 to 108, when the decrease of the fluid amount upon the anti-lock control does not depend on the problem with the power fluid pressure source 40, but it depends on the problem with the anti-lock control system. That is to say, the deactivation of the motor 42 is released and the fluid pressure P(t) is again compared with the predetermined value Pm at step 106. In the case where the fluid pressure P(t) is still below the predetermined value Pm after the predetermined value Pm, the motor 42 is stopped (step 107) and it the case where the fluid pressure P(t) is above the predetermined value Pm, the motor 42 is continuously driven upon normal brake actuation and the hydraulic booster 20 is actuated (step 108).

When a vehicle speed V(t) falls below the predetermined speed Vm at step 109 by the abovementioned anti-lock control actuation, it comes back to step 100 and a slip ratio S(t) is checked, and when the vehicle's speed V(t) rises above the predetermined speed Vm, step 101 and so on are again performed.

As aforementioned, when the fluid quantity of the brake fluid of the reservoir falls below the predetermined value in the present invention, the motor of the power fluid pressure is deactivated for a predetermined time, and when it is judged that the power fluid pressure falls below a predetermined value, the anti-lock control is stopped, so that the driver can receive the warning in advance of the transfer time to the normal brake actuation and the brake fluid quantity required for the brake actuation is assured. Further, an apparatus which is provided with the fluid level warning apparatus of a conventional self diagnosis apparatus can be used as the fluid level detector, so that it is not always necessary to provide a separate apparatus. The fluid pressure detector is provided for the motor control so that it can be used.

It should be apparent to one skilled in the art that the above described embodiments are merely illustrative of but a few of the many possible specific embodiments of the present invention. Numerous and various other arrangements can be readily devised by those skilled in the art without departing from the spirit and scope of the invention as defined in the following claims.

What is claimed is:

1. A hydraulic brake system for vehicles comprising:
   a reservoir for storing a brake fluid,
   a power fluid pressure source supplying a power fluid pressure by increasing the pressure to a predetermined pressure by means of a motor driven pump,
   a brake fluid pressure control apparatus fluidically communicated with the power fluid pressure source and said reservoir in response to operation of a brake pedal of a vehicle,
   a wheel cylinder fluidically communicated with said brake fluid pressure control apparatus via a plurality of fluid passages for operating a brake member in response to an output brake fluid pressure,
   a first fluid passage fluidically communicating said wheel cylinder with said reservoir,
   a second fluid passage accepting the power fluid pressure as an input,
   an anti-lock control apparatus for open-close controlling said first and second fluid passages by a valve apparatus in response to a brake locking condition,
   a fluid level detector for detecting the level of the brake fluid in said reservoir,
   a fluid quantity discriminating means for discriminating whether the fluid quantity of the brake fluid is above a predetermined value or not by an output signal of the fluid quantity detector,
   a motor control means for deactivating said motor driven pump when it is discriminated that the fluid quantity of the brake fluid falls below a predetermined value of the fluid quantity of the brake fluid by the fluid quantity discriminating means, a pressure detector for detecting an output power fluid pressure of said power fluid pressure source, a fluid pressure discriminating means accepting an output signal of said pressure detector as an input and discriminating whether the output power fluid pressure of said power fluid pressure source is above the predetermined value or not, and an anti-lock control stop means for stopping the open-close control of said valve apparatus in said anti-lock control apparatus when it is determined that the fluid quantity of the brake fluid falls below the predetermined value by said fluid quantity discriminating means and the output power fluid pressure falls below the predetermined value by said fluid pressure discriminating means.

2. A hydraulic brake system for vehicles, characterized by that said motor control means releases said deactivation of said motor driven pump by a stop signal of said anti-lock control stop means, and stops said motor driven pump, when it is determined again by said fluid pressure discriminating means that said output power fluid pressure of said power fluid pressure source is under the predetermined value.

* * * * *